Patented June 19, 1951

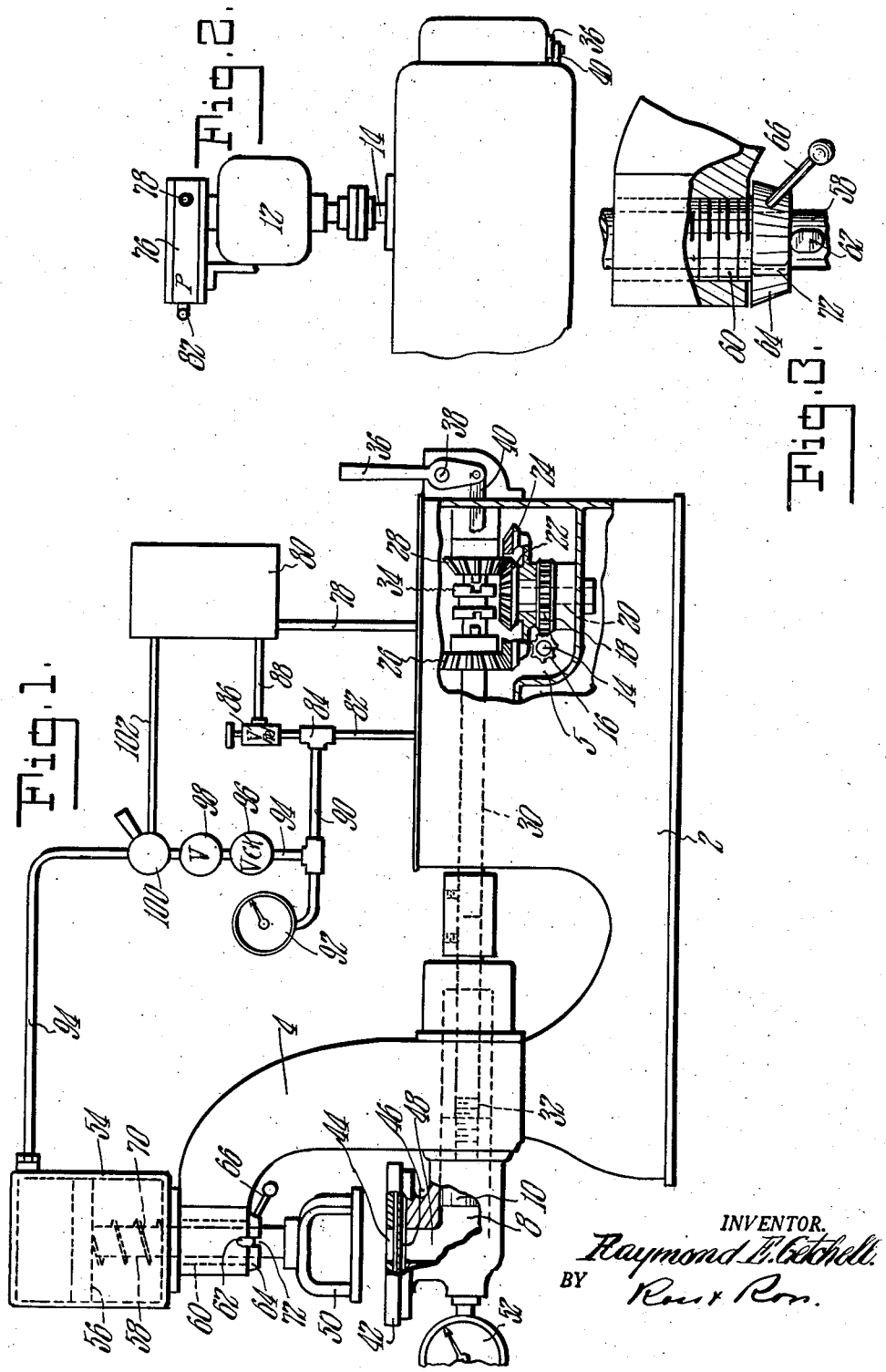

2,557,184

UNITED STATES PATENT OFFICE 2,557,184

PRESSURE OPERATED RUPTURE TESTING MACHINE

Raymond E. Getchell, Holyoke, Mass., assignor to B. F. Perkins & Son, Inc., Holyoke, Mass., a corporation of Massachusetts Application January 24, 1949, Serial No. 72,295

6 Claims. (Cl. 73—102)

My invention relates to rupture testing machines of the type wherein a specimen of sheet material is clamped by a clamp to an apertured platform and a flexible diaphragm is forced by a press, of the air or liquid type, through the aperture for rupturing the specimen being tested.

The principal objects of this invention are directed to a testing machine wherein the specimen may be clamped to the platform under a desired predetermined pressure which is not effected by the pressure applied to the specimen through the diaphragm all as will hereinafter appear.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view with parts in section of a testing machine embodying the novel features of the invention;

Fig. 2 is a partial plan view of the machine shown in Fig. 1; and

Fig. 3 is an enlarged view showing means for maintaining the clamping pressure.

Referring now to the drawings more in detail, the invention will be fully described.

A base is shown at 2 which has a yoke 4 extending upwardly from the forward end thereof and a compartment 5 at its rear end.

A piston bore is provided at 8 in which a piston 10 is reciprocable.

A motor 12 has a shaft 14 extending into the compartment 5 which carries a worm 16 that is in mesh with a worm gear 18 rotatable on a shaft 20.

Inner and outer bevel gears 22 and 24 are fixed to the gear 18 and mesh with gears 26 and 28 which are rotatable on a shaft 30. Said shaft 30 is screw threaded at its forward end 32. This forward end is in engagement with piston 10 and as shaft 30 is rotated in one direction or the other, the piston is moved forward or back in bore 8.

A clutch member 34 has slots for engaging with the teeth of the gear 26 or 28, as shown, and is movable back and forth on the shaft 30. The shaft is rotated in one direction or the other by clutching one or the other of the gears 26 or 28 thereto to the clutch which is slidable but non-rotatable on shaft 30.

A lever 36 pivoted at 38 has a link 40 connected to its lower end which engages the clutch in the usual manner for moving it back and forth on shaft 30.

A platform 42 has an aperture 44, as shown, and a diaphragm 46, which is flexible, is disposed therebelow and over a passageway 48 which is in communication with bore 8.

A clamp 50 is provided which is operated to clamp a specimen to be tested to the platform 42. Means to operate the clamp will be later described.

With a specimen clamped to the platform the piston 10 is moved forwardly so that liquid in the bore acts so as to distend the diaphragm which engages and ruptures the specimen.

The pressure of the liquid is indicated by a gauge 52 which taken in connection with the area of the aperture in the platform provides an indication of the ability of the specimen to resist bursting. This is known as a bursting test.

It will be appreciated that, as the diaphragm is distended, there is a tendency for it to raise the clamp which is objectionable and this is overcome as will later appear.

A cylinder 54 is secured to the upper end of member 4 and has a piston 56 reciprocable therein. A piston rod 58 extends from the piston 56 and is reciprocable in a stop member 60 which is screw threaded in member 4 for up and down movements as will be observed by reference to Fig. 3.

The rod 58 has a pin 62 extending therefrom and a head 64 on member 60 has a manually engageable member 66 extending therefrom. A spring 70 in cylinder 54 urges piston 56 upwardly. The clamp 50 is secured to the lower end of rod 58.

Pressure is applied to the upper side of piston 56 so that the clamp 50 operates to clamp a specimen to the platform 42. This pressure may be as desired as will later appear and to hold the clamp in clamping position wherein the pin 62 will be positioned downwardly as in Fig. 3 the member 66 is grasped and the member 60 rotated so that the underside of head thereof overlies pin 62. In this way if pressure on the piston is released the clamp is held in clamping position.

When pressure on the piston 56 is released the member 60 may be turned to the position of Fig. 1 so that the piston rod will be moved upwardly by spring 70 therearound, the pin passing upwardly into a slot 72 of head 64.

Pressure is applied to the piston by means of the following:

A pump 76 is operatively connected to the electric motor 12 and has its suction connected by a pipe 78 to a tank 80 for fluid such as oil or air or the like.

A pipe 82 extends from the discharge of the pump and is connected by a fitting 84 to a relief valve 86 which is connected to tank 80 by pipe 88.

A pipe 90 from the fitting 84 extends to a pressure gauge 92 and a pipe 94 extends therefrom to the cylinder 54.

In the pipe 94, there is a check valve 96, shut-off valve 98 and a four-way valve 100 which is connected by a pipe 102 to tank 80. These valves will be of ordinary form and as are well known in the art.

In the operation of the apparatus with the motor 12 in operation, a specimen to be tested is placed on the platform 42. Valve 98 is opened and valve 100 is set so that pressure from the pump flows to cylinder 54 to act on and move piston 56 downwardly so that the clamp 50 clamps the specimen to the platform.

The relief valve 86 is set so that a desired predetermined pressure prevails in the system and a predetermined pressure is applied to the specimen.

With the specimen clamped in place, shaft 30 is rotated by clutching one of the gears to the shaft and piston 10 moves forwardly to force fluid upwardly against the diaphragm 46 which acts on the specimen. Gauge 52 indicates the amount of pressure applied to the diaphragm.

To overcome the diaphragm forcing the clamp 50 upwardly, member 60 is turned so that part 64 thereof overlies pin 62, as is shown in Fig. 3.

With clamp 50 and spindle 58 held against upward movement, a four-way valve may be operated so that pressure flows to tank 80. It is possible to apply the clamping pressure and then to hold the pressure by means of member 60 so that the piston 56 may be relieved of pressure.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A testing machine comprising in combination, a support having an interconnected piston bore and chamber closed by a yieldable diaphragm and apertured specimen support, a diaphragm piston in said piston bore reciprocable forwardly to force fluid against said diaphragm to distend the same and rupture a specimen clamped to said specimen support, a cylinder having a clamp piston reciprocable therein between upper non-clamping and lower clamping positions, means urging said clamp piston to upper position, a yoke supporting said cylinder, a rod extending from said clamp piston reciprocable in said yoke having a clamp on the lower end thereof for clamping a specimen to said specimen support, means to simultaneously reciprocate said diaphragm piston forwardly and to apply pressure to said clamp piston whereby a specimen is clamped thereby to said support and said diaphragm is distended, and manually operable means carried by said yoke and said rod respectively to hold said clamp in clamping position on release of pressure applied to said clamp piston.

2. A testing machine comprising in combination, a support having an interconnected piston bore and chamber closed by a yieldable diaphragm and apertured specimen support, a diaphragm piston in said piston bore reciprocable forwardly to force fluid against said diaphragm to distend the same and rupture a specimen clamped to said specimen support, a cylinder having a clamp piston reciprocable therein between upper non-clamping and lower clamping positions, means urging said clamp piston to upper position, a yoke supporting said cylinder, a rod extending from said clamp piston reciprocable in said yoke having a clamp on the lower end thereof for clamping a specimen to said specimen support, means to simultaneously reciprocate said diaphragm piston forwardly and to apply pressure to said clamp piston whereby a specimen is clamped thereby to said support and said diaphragm is distended, and manually operable means carried by said yoke and said rod respectively to hold said clamp in clamping position on release of pressure applied to said clamp, said means including a stop provided on said rod and a member rotatable thereon having a portion for disposition between said yoke and stop when said clamp is in clamping position.

3. A testing machine comprising in combination, a support having an interconnected piston bore and chamber closed by a yieldable diaphragm and apertured specimen support, a diaphragm piston in said piston bore reciprocable forwardly to force fluid against said diaphragm to distend the same and rupture a specimen clamped to said specimen support, a cylinder having a clamp piston reciprocable therein between upper non-clamping and lower clamping positions, means urging said clamp piston to upper position, a yoke supporting said cylinder, a rod extending from said clamp piston reciprocable in said yoke having a clamp on the lower end thereof for clamping a specimen to said specimen support, a pressure pump and a tank, a motor, operative connections between said motor and diaphragm piston, pipe connections between said pump and tank and cylinder whereby said clamp piston is moved to clamping position by operation of said pump, and manually operable means carried by said yoke and said rod respectively to hold said clamp in clamping position.

4. A testing machine comprising in combination, a support having an interconnected piston bore and chamber closed by a yieldable diaphragm and apertured specimen support, a diaphragm piston in said piston bore reciprocable forwardly to force fluid against said diaphragm to rupture a specimen clamped to said specimen support, a cylinder having a clamp piston reciprocable therein between upper non-clamping and lower clamping positions, means urging said clamp piston to upper position, a yoke supporting said cylinder, a rod extending from said clamp piston reciprocable in said yoke having a clamp on the lower end thereof for clamping a specimen to said specimen support, a pressure pump and a tank, a motor, operative connections between said motor and diaphgram piston, pipe connections between said pump and tank and cylinder whereby said clamp piston is moved to clamping position by operation of said pump, and manually operable means carried by said yoke and said rod respectively to hold said clamp in clamping position, said pipe connections including means for releasing pressure whereby said operable means holds the clamp in clamping position.

5. A testing machine comprising in combination, a support having an interconnected piston bore and chamber closed by a yieldable diaphragm and apertured specimen support, a diaphragm piston in said piston bore reciprocable forwardly to force fluid against said diaphragm to rupture a specimen clamped to said specimen support, a cylinder having a clamp piston reciprocable therein between upper non-clamping and lower clamping positions, means urging said clamp piston to upper position, a yoke supporting said cylinder, a rod extending from said clamp piston reciprocable in said yoke having a clamp on the lower end thereof for clamping a specimen to said specimen support, a pressure pump and a motor operatively connected thereto, a tank and pipe connections between said tank and pump and cylinder providing a closed pressure system whereby pressure is applied to said clamp piston by operation of said pump, operative connections between said motor and diaphragm piston, said pipe connections including means for relieving pressure when a predetermined pressure in said system is attained and other means for relieving said clamp piston of pressure, and means carried by said yoke and said rod respectively holding said clamp in clamping position when said clamp piston has been relieved of pressure.

6. A testing machine comprising in combination, a support having an interconnected piston bore and chamber closed by a yieldable diaphragm and apertured specimen support, a diaphragm piston in the piston bore reciprocable forwardly to force fluid against said diaphragm to distend the same and rupture a specimen clamped to said support, a cylinder having a clamp piston reciprocable therein between non-clamping and clamping positions, means urging the clamp piston to the non-clamping position, a yoke supporting said cylinder, a rod extending from the clamp piston reciprocable in said yoke having a clamp on the lower end thereof for clamping a specimen to said support, means for simultaneously reciprocating said diaphragm piston forwardly and for applying pressure to the clamp piston whereby a specimen is clamped thereby to said support and the diaphragm is distended, and manually operable means carried by said yoke and said rod respectively to hold the clamp in clamping position on release of pressure applied to the clamp piston.

RAYMOND E. GETCHELL.

REFERENCES CITED

The following references are of record in the file of this patent:

UNITED STATES PATENTS

| Number | Name | Date |
| --- | --- | --- |
| 1,116,118 | Putnam | Nov. 3, 1914 |
| 1,530,678 | La Batt et al. | Mar. 24, 1925 |
| 1,599,964 | Haven | Sept. 14, 1926 |
| 2,186,213 | Senna | Jan. 9, 1940 |
| 2,273,152 | Sonntag | Feb. 17, 1942 |
| 2,340,733 | Clark | Feb. 1, 1944 |
| 2,482,147 | Bashore | Sept. 20, 1949 |
| 2,525,345 | Getchell | Oct. 10, 1950 |